L. J. LATSHAW.
AUXILIARY FUEL TANK FOR INTERNAL COMBUSTION ENGINES.
APPLICATION FILED MAY 23, 1921.

1,413,037.

Patented Apr. 18, 1922.

Inventor
LEONARD J. LATSHAW

By Lockwood & Lockwood
Attorneys

UNITED STATES PATENT OFFICE.

LEONARD J. LATSHAW, OF ANDERSON, INDIANA, ASSIGNOR TO ANDERSON FOUNDRY AND MACHINE COMPANY, OF ANDERSON, INDIANA.

AUXILIARY FUEL TANK FOR INTERNAL-COMBUSTION ENGINES.

1,413,037.

Specification of Letters Patent.   Patented Apr. 18, 1922.

Application filed May 23, 1921. Serial No. 471,809.

*To all whom it may concern:*

Be it known that I, LEONARD J. LATSHAW, a citizen of the United States, and a resident of Anderson, county of Madison, and State of Indiana, have invented a certain new and useful Auxiliary Fuel Tank for Internal-Combustion Engines; and I do hereby declare that the following is a full, clear, and exact description thereof, reference being had to the accompanying drawings, in which like numerals refer to like parts.

This invention relates to an auxiliary fuel tank for internal combustion engines for maintaining a supply of fuel which may be readily and directly drawn upon by the engine rather than taking the fuel direct from the supply tank.

One feature of the invention enables the owner of the engine to comply with the underwriters' rules relating to the storage of oil and other combustible material in insured buildings wherein the stationary engine is used, in that the capacity of the tank is much less than the maximum amount permitted by the underwriters' association.

Another feature of the invention relates to the construction of the tank wherein it acts as a settling tank in which the sediment carried by the oil current drifts slowly to the bottom of the tank where it remains until the drain cock in the bottom of the tank is opened and the sediment collected therein is drawn off without disturbing the operation of the engine.

Another feature of the invention consists in the means for heating the fuel by water jacketing the fuel containing chamber and permitting the hot water from the cylinder water jackets to circulate therethrough. By thus preheating the fuel it raises the temperature of the oil sufficiently to cause it to flow readily through the oil pipe and fuel compartment in case of the oil engine, and in case of the gasoline engine increases the volatilization of the fuel.

Still another feature of the invention is in the novel method of piping the auxiliary tank wherein the fuel will be maintained at a constant level, the surplus being conducted away and back to the main fuel reservoir so that all of the fuel which is admitted will not circulate through the auxiliary tank but only that amount required to maintain the operation of the engine is taken so that the maximum time for preheating is permitted before the fuel is fed into the engine.

The full nature of this invention will be understood from the accompanying drawings and the following description and claims.

Figure 1:
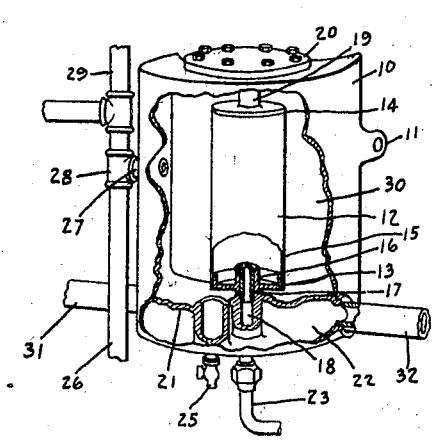
Figure 2:
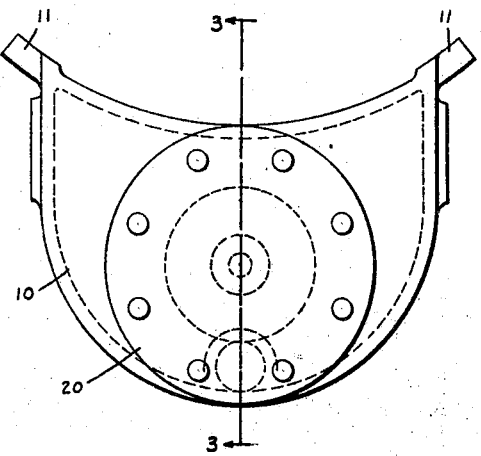
Figure 3:
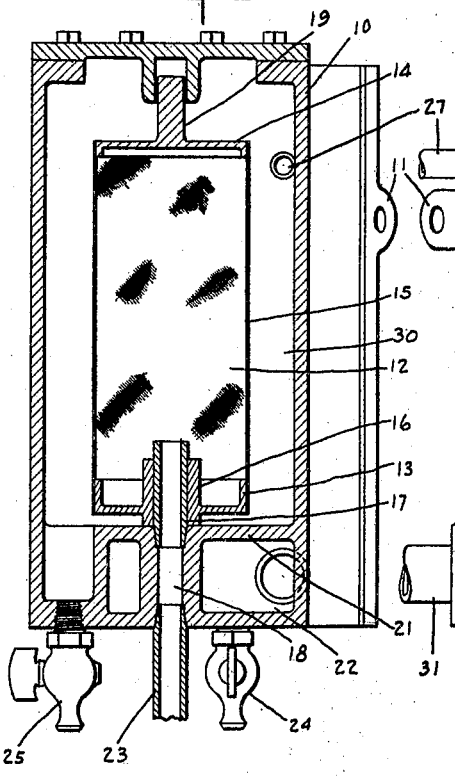
Figure 4:
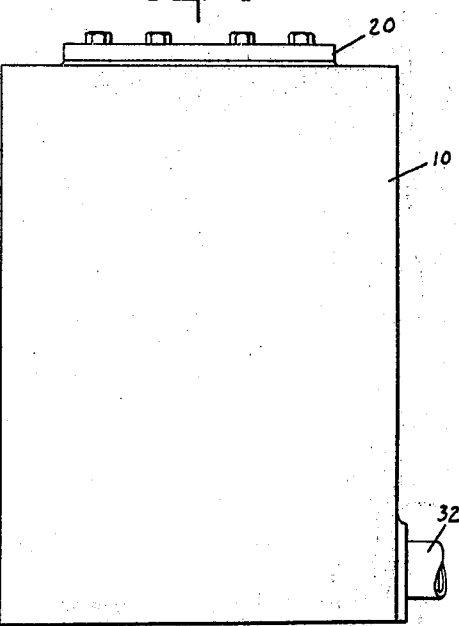

In the drawings Fig. 1 is a perspective view of the auxiliary fuel tank showing the front wall thereof broken away. Fig. 2 is a plan view looking down. Fig. 3 is a central vertical cross section taken on the line 3—3 of Fig. 2. Fig. 4 is a front elevation.

In the drawings there is shown an auxiliary oil tank used in connection with oil engines adapted to be mounted in proximity to the engine and at a distance from the main fuel reservoir, whereby the oil will be pumped from the main reservoir at a distance, into the auxiliary tank, any surplus of oil returning to the main reservoir. The engine will draw its fuel direct from the auxiliary tank after the fuel has been heated therein by the hot water jackets, and the sediment and water in the fuel has been separated therefrom. The auxiliary oil tank is composed of an outer casing or enclosure 10 supported in a suitable place by means of the brackets 11 and containing therein, centrally mounted, a cylindrical oil strainer 12. The oil strainer is provided with an annular cast metal bottom 13 which is cup-shaped and an annular top 14. The side of the cylindrical strainer is of closely woven wire cloth 15 secured to the periphery of the top and bottom so as to form a closed cylindrical straining member. Centrally located in the bottom 13 there is a walled opening 16 in which is mounted a nipple 17, which extends into and communicates with the passage 18 centrally and vertically positioned in the bottom of the enclosing casing. The top 14 is provided with an upwardly extending projection 19 arranged to be engaged in the brace 20 on the outer casing for securing the strainer in position when said top is bolted on the casing.

The lower portion of the outer casing is provided with a false bottom 21 which forms a water jacket chamber 22 between the bottom of the tank and the false bottom 21. The passage 18 extends directly through the water jacket chamber and connects the nipple 17 with the pipe 23. A pet cock 24 is provided in the bottom of the tank for draining the water from the water jacket chamber 22, and a second pet cock 25 is mounted adjacent in the bottom of the tank adjacent the water jacket and in communication with the interior of the tank.

The oil inlet pipe 26 is connected with an oil pump on the engine of the usual type, not shown herein, which forces the oil to the auxiliary tank through the feed line 27 connected with said pipe by the T-connection 28. The overflow pipe 29 is a continuation of the oil supply pipe 26 and the feed line 27 admits only such amount of oil as is required to maintain a constant level within the chamber 30 of the auxiliary oil tank, the surplus being conducted away through the pipe 29 and returned to the main fuel reservoir from whence it is pumped again by the oil pump to the auxiliary tank. It will, therefore, be understood that all of the oil which is pumped from the reservoir does not circulate through the auxiliary oil tank, but only that amount required to maintain the operation of the engine, passes into the auxiliary tank, which permits the purification of the fuel actually required and the preheating of only the oil required by the engine, thereby increasing the efficiency of the preheating arrangement.

The water jacket 22 is connected by the pipe 31 to the water cooling jacket of the engine so that the heated water of said engine jacket will be supplied to the chamber 22. The water jacket returns from the chamber 22 to the water jacket of the engine through the pipe 32, thereby insuring the circulation of hot water through the auxiliary tank for preheating the fuel contained therein.

In operation the oil will be pumped up through the pipe 26 and into the chamber 30 through the pipe 27, seeking a level of said pipe. It will be drawn, however, to the engine by gravity and suction through the nipple 17, passage 18 and pipe 23. Therefore, only that amount of oil will be fed to the engine which lies between the top of the nipple 17 and the pipe 27. While the oil stands in the gasoline tank a portion of the sediment or foreign matter contained therein will be precipitated to the false bottom 21 and into the bottom of the tank to be drawn off through the pet cock 25. Only that oil passing through the fine mesh wire screen 15 will pass into the engine, said screen mesh being fine enough to prevent any solid sediment or water which may be suspended in the oil from passing through the nipple 17. The water contained in the oil, which is usually one or two per cent, will be separated from the oil by said screen and precipitated to the bottom of the tank where it can be drawn off through the pet cock 25 together with the sediment.

The false bottom 21 forms a hot plate which is heated to a high degree, by the engine cooling water passing from the engine through the chamber 18, and preheats the oil contained in the tank raising said oil to a high temperature whereby it will flow readily through the oil piping and fuel pumps.

This invention may also be used in connection with an oil and water pump built into the same unit and driven by a belt over a pulley conveniently placed in the engine. Should the belt break or run off of the face of the pulley the oil supply to the engine would stop and likewise the water circulating through the water jackets of the engine would stop. But, in such a contingency with the aforesaid units, as no more oil would be pumped to the auxiliary tank, the engine would run only so long as it would take to use up what oil was contained between the oil inlet 27 and the top of the nipple 13. The time that the engine would run on this small amount of oil would do no damage and it would then stop until the repair had been made. This would eliminate the danger of the engine continuing to run when the water circulation had stopped.

The invention claimed is:

1. An auxiliary fuel tank for internal combustion engines, including a fuel containing chamber, a fuel inlet positioned near the top of said chamber adapted to maintain fuel therein at a given level, a false bottom formed in the lower portion of said chamber having an outlet passage therethrough, a cylindrical screen straining member supported on said false bottom, a nipple communicating with said passage and extending upwardly into said screen, a water jacket formed in connection with said false bottom, whereby the same will be heated by hot water passing therethrough, and a sludge chamber formed in said casing adjacent said bottom for collecting foreign matter precipitated by the oil and separated therefrom by said screen whereby the oil passing from said tank will be purified and preheated.

2. An auxiliary fuel tank for an internal combustion engine, including a tank casing, a false bottom therein, a cover therefor, tubular straining means within said casing, means on said false bottom and said cover for supporting said tubular straining means in position, means for supplying the chamber formed by said false bottom and the tank bottom with a heating medium, and means associated with the tank for insuring a circulation therethrough and through said tubular straining means.

In witness whereof, I have hereunto affixed my signature.

LEONARD J. LATSHAW.